(12) United States Patent
Wang et al.

(10) Patent No.: US 7,530,747 B2
(45) Date of Patent: May 12, 2009

(54) MOBILE DEVICE WITH A DIGITAL CAMERA AND ASSEMBLY METHOD THEREOF

(75) Inventors: Chung-Ming Wang, Taipei (TW); Kun-Shiang Tsai, Taipei (TW)

(73) Assignee: Asustek Computer Inc., Taipei (TW)

( * ) Notice: Subject to any disclaimer, the term of this patent is extended or adjusted under 35 U.S.C. 154(b) by 498 days.

(21) Appl. No.: 11/340,635

(22) Filed: Jan. 27, 2006

(65) Prior Publication Data
US 2007/0049340 A1    Mar. 1, 2007

(30) Foreign Application Priority Data
Aug. 30, 2005    (TW) ............................... 94129641 A

(51) Int. Cl.
G03B 17/00    (2006.01)
G02B 27/02    (2006.01)
G02B 7/18    (2006.01)

(52) U.S. Cl. ..................... 396/529; 359/802; 359/803; 359/825

(58) Field of Classification Search ................... 396/85, 396/72, 76, 79, 281, 287, 374, 379, 429, 396/544, 529, 535; 348/333.08, 333.12, 348/375; 359/802, 803, 811, 823, 825, 830
See application file for complete search history.

(56) References Cited

U.S. PATENT DOCUMENTS 5,416,549 A * 5/1995 Katsuyama et al. ......... 396/529
7,127,162 B2 * 10/2006 Mano .......................... 396/144
7,177,539 B2 * 2/2007 Ito et al. ....................... 396/85

* cited by examiner

Primary Examiner—Reena Aurora
(74) Attorney, Agent, or Firm—Bacon & Thomas, PLLC

(57) ABSTRACT

A mobile device having a digital camera and an assembling method for a ring is disclosed. The mobile device includes a housing, a digital camera module and the ring, wherein the housing has a through hole which a notch is formed therein. The digital camera module has an arm. The ring is disposed in the through hole. Besides, one side of the ring includes an extended part which is located on the notch and forms a dynamic relationship with the arm.

15 Claims, 5 Drawing Sheets

MOBILE DEVICE WITH A DIGITAL CAMERA AND ASSEMBLY METHOD THEREOF

BACKGROUND OF THE INVENTION

1. Field of the Invention

The present invention generally relates to a mobile device and, more particularly, to a mobile device with a digital camera and an assembly method thereof.

2. Description of Related Art

Mobile phones are built with digital lenses for providing a digital camera function, but conventional digital cameras configured on the mobile phones do not support the optical zooming function. In general, a digital zooming function can only be simulated by graphic and image processing software which is capable of partially enlarging or reducing sizes of images. This simulating software, however, may cause blurred pictures.

Recently, the manual zooming digital camera modules are provided on the mobile phones and it can photograph not only at a regular distance but also at a close distance. Besides, the manual zooming digital camera is capable of zooming-in or zooming-out function by rotating a ring configured on the mobile phone.

The conventional manual zooming digital camera modules are mainly assembled by three portions including a rotatable ring, a housing, and a third section which can be a supporting or restraining means. The third section and the housing construct a containing space so that the rotatable ring can be disposed and rotated in the containing space.

Nevertheless, the third section and the housing are coupled by the hot-melt means or the adhesives, wherein additional tooling is required in a hot-melt process, thus increasing the cost of manufacturing the ring, and further the adhesives break easily. In addition, the hot-melt means and adhesives may be not strong enough to bear external force.

Accordingly, it is known that the third section in the conventional mobile device will result in increasing the cost of manufacturing the ring and the dimension of the mobile device. Therefore, it is desirable to provide an improved mobile device to mitigate and/or obviate the aforementioned problems.

SUMMARY OF THE INVENTION

An object of the present invention provides a mobile device with a digital camera module and an assembly method for reducing the manufacturing cost and allowing easy assembly.

Another object of the present invention provides a mobile device with a digital camera module and an assembly method for easily assembling a ring on a housing of the mobile device, wherein the ring is capable of rotating on the housing to provide zooming and focusing functions.

In accordance with an object of the present invention, a mobile device with a digital camera module is provided. The mobile device includes a housing, a digital camera module, and a ring. The housing has a through hole and a first notch and a second notch formed in the through hole. The digital camera module includes an arm. The ring has a first side forming an extended portion and a bump, wherein the extended portion is disposed in the first notch and is interacted with the arm, and the bump is disposed in the second notch, such that the ring is assembled on the housing by the extended portion and the bump.

In accordance with an object of the present invention, a mobile device with a digital camera module is provided. The mobile device includes a housing, a digital camera module, and a ring. The housing forms a through hole, wherein a first notch and a second notch are defined around the through hole. The digital camera module includes an arm. The ring includes an extended portion and at least one bump. The extended portion is disposed in the first notch and is interacted with the arm, and the bump is disposed in the second notch.

A block is disposed in the first notch to provide a drop height when the extended portion of the ring passes the block. In addition, two edges of the first notch respectively have a hitch, such that the hitches are kept the extended portion in the first notch when the extended portion is disposed.

The through hole further forms a plurality of openings, and a plurality of protruding portions is disposed between the openings, wherein the first notch and the second notch are disposed between two of the protruding portions.

A second side of the ring includes a driving portion for enabling users to control the ring. The first side of the ring further includes a second bump, one of the protruding portions further forms a third notch, and the second bump is disposed in the third notch.

In accordance with an object of the present invention, a method of assembling a mobile device is provided. The mobile device includes a housing having a through hole, two openings defined around the through hole and corresponding to at least two protruding portions, two sides of each of the protruding portions respectively including a hitch, and a ring including a first side, an extended portion and at least one bump. The method of assembling a mobile device is characterized in including the steps of passing the extended portion of the ring through one of the openings of the housing; and making the extended portion or the bump of the ring cross the hitches of the housing, wherein the extended portion or the bump is respectively movable corresponding to one of the protruding portions.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
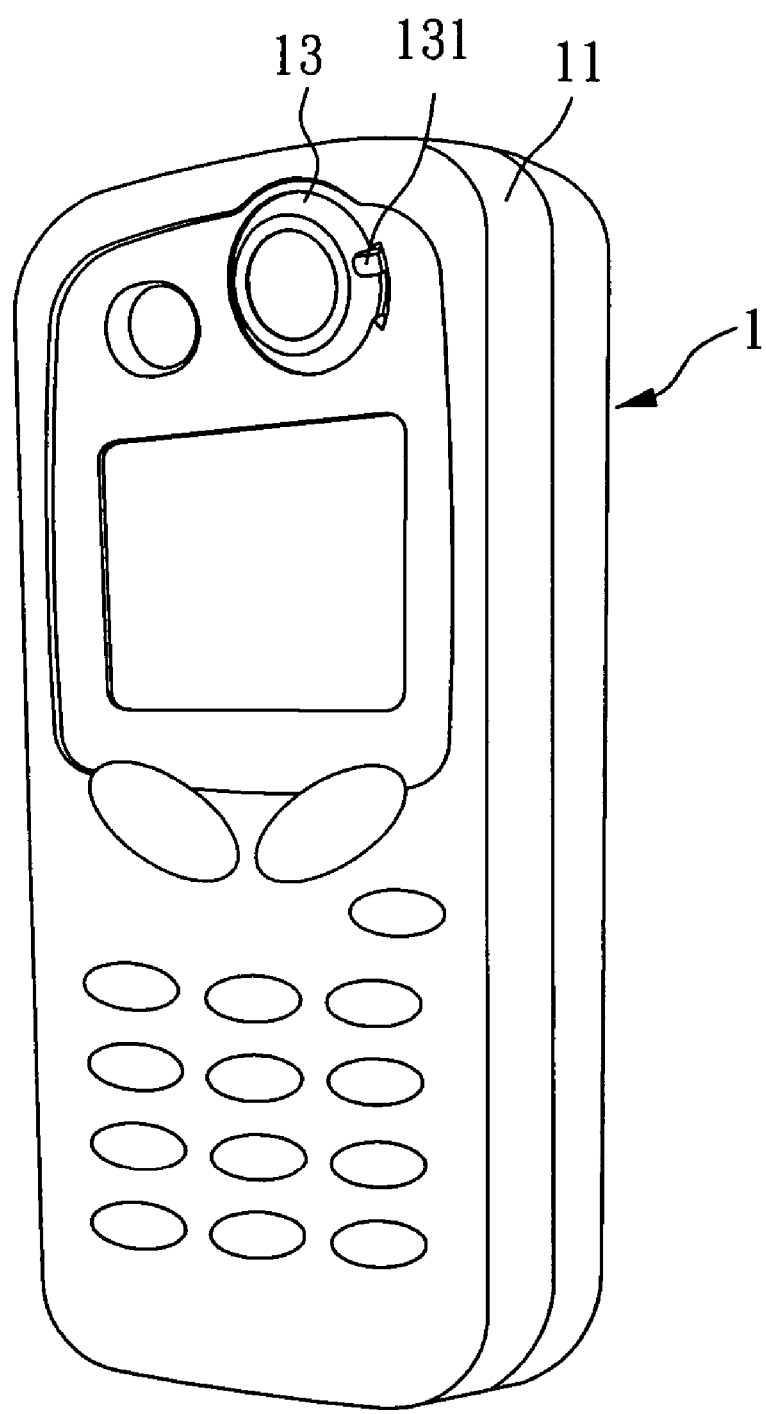
FIG. 1 is a perspective view of a preferred embodiment of the present invention.

The present invention provides a design to permit easy assembly of a mobile device with a digital camera capable of manually zooming and focusing during an image capturing process. FIG. 1 shows a mobile device of a preferred embodiment of the present invention. The mobile device 1 includes a housing 11 and a ring 13. In the embodiment, the mobile device 1 can be a bar-type mobile phone. The housing 11 may be an upper cover of the mobile device 1, and the ring 13 is attached to the upper cover of the mobile device 1. In other embodiments, the ring 13 may be disposed on a bottom cover of a mobile device. The present invention is not limited in bar-type phones, but also may be utilized in folding-type phones, sliding-cover phones, smart phones, PDAs, or other mobile devices.

A driving portion 131 is formed on the surface of the ring 13, which enables a user to control a zooming-in and zooming-out function. The driving portion 131 is used to drive the ring 13 and is not limited in a specific form. For instance, the driving portion 131 can be a bulge with a regular or triangular shape. In other embodiments, the driving portion 131 may be received in a recess of the ring 13 so that a user may drive the ring 13 by the recess.

Figure 2:
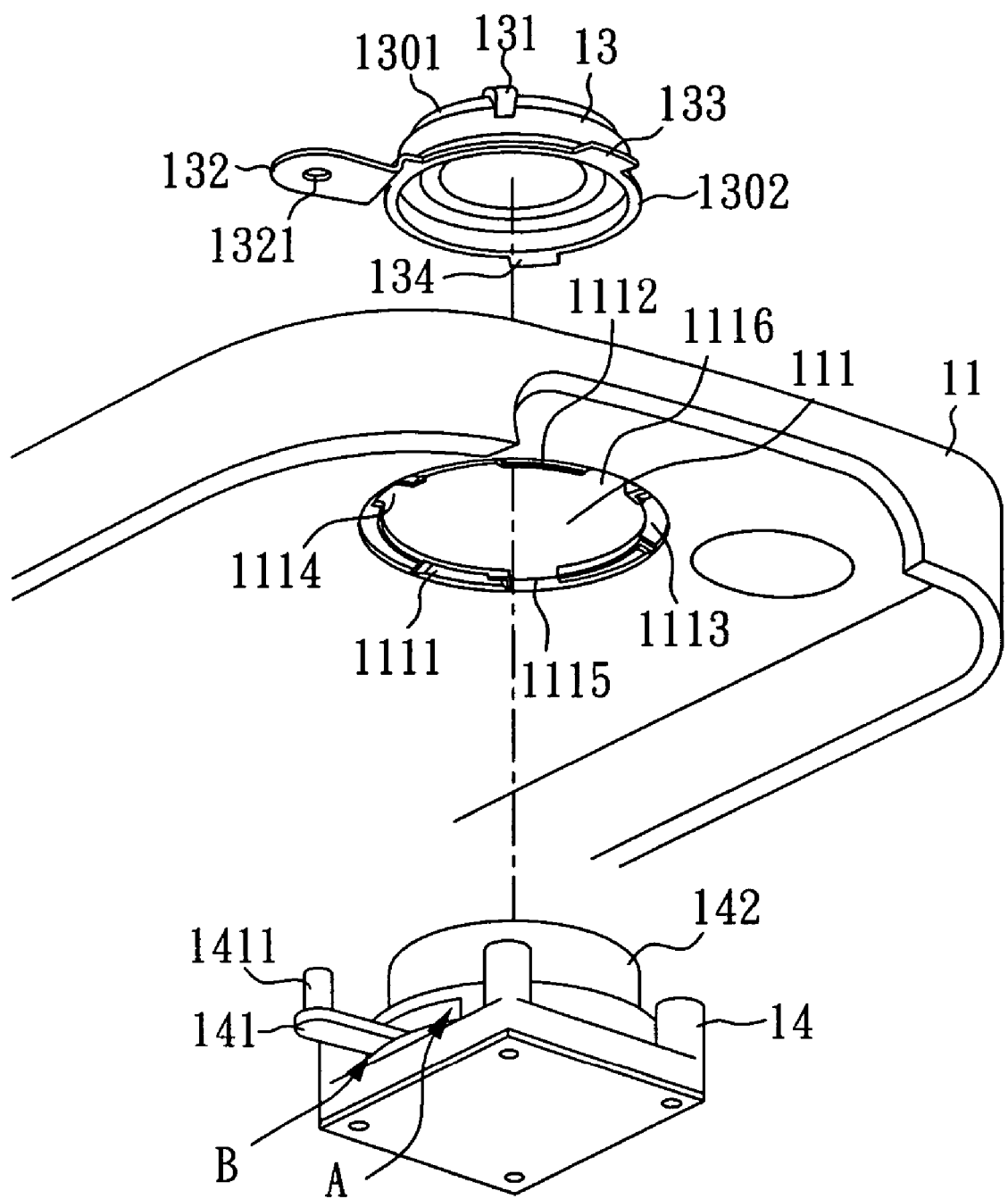
FIG. 2 is an exploded view of the preferred embodiment of the present invention.

FIG. 2 shows an exploded view of the mobile device. The mobile device includes the ring 13, the housing 11, and the digital camera module 14. The housing has a through hole 111, wherein openings 1114, 1115, 1116 are formed around the through hole 111 and respectively correspond to protruding portions 1111, 1112, 1113.

A first side 1301 of the ring 13 has the driving portion 131 thereon, and a second side 1302 of the ring 13 has an extended portion 132, and bumps 133, 134. In the present embodiment, the first side 1301 of the ring 13 is defined as an upper side, and the second side 1302 of the ring 13 is defined as a bottom side. In addition, the extended portion 132 further forms a hole 1321.

The digital camera module 14 includes an arm 141 and a lens 142, wherein the arm 141 includes a short pillar 1411 corresponding to the through hole 1321 of the extended portion 132 of the ring 13. In addition, the arm 14 is interacted with the lens 142. When the short pillar 1411 is engaged with the through hole 1321 of the extended portion 132 of the ring 13, the extended portion 132 is utilized to control the motion of the arm 141 for controlling the zooming function of the digital camera 14. For instance, when the arm 141 is rotated from a first position A to a second position B, a focus of the lens 142 is changed to thus execute the zooming-in function. On the other hand, when the arm 141 is rotated from the second position B to the first position A, the digital camera 14 is capable of executing the zooming-out function.

Figure 3:
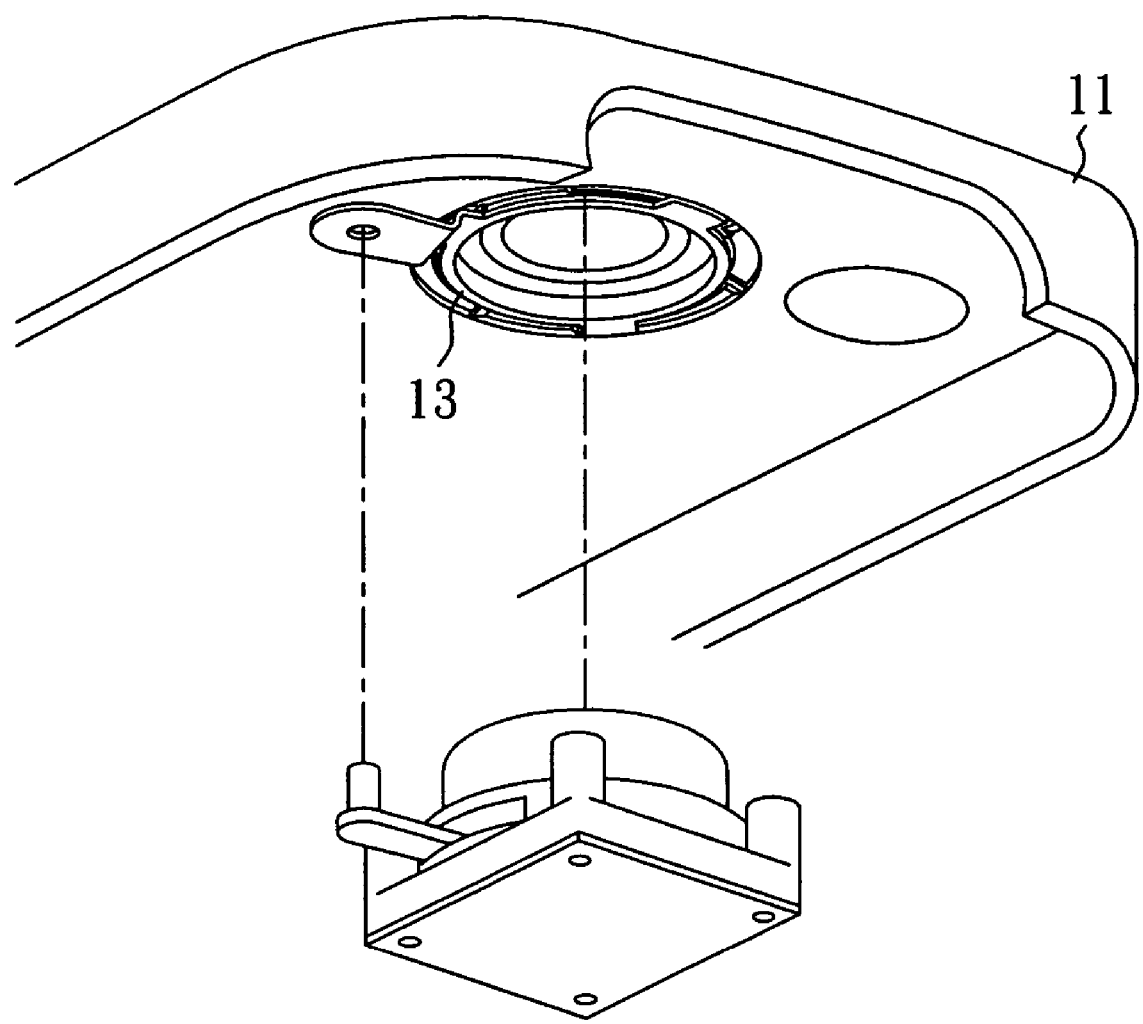
FIG. 3 shows the ring attached to the housing of the present invention.

According to the design provided by the present invention, the ring 13 is allowed to be directly attached to the housing 11, as shown in FIG. 3. The detailed steps of assembling the ring 13 and the housing 11 are described in the following and shown in FIGS. 4a and 4b.

Figure 4A:
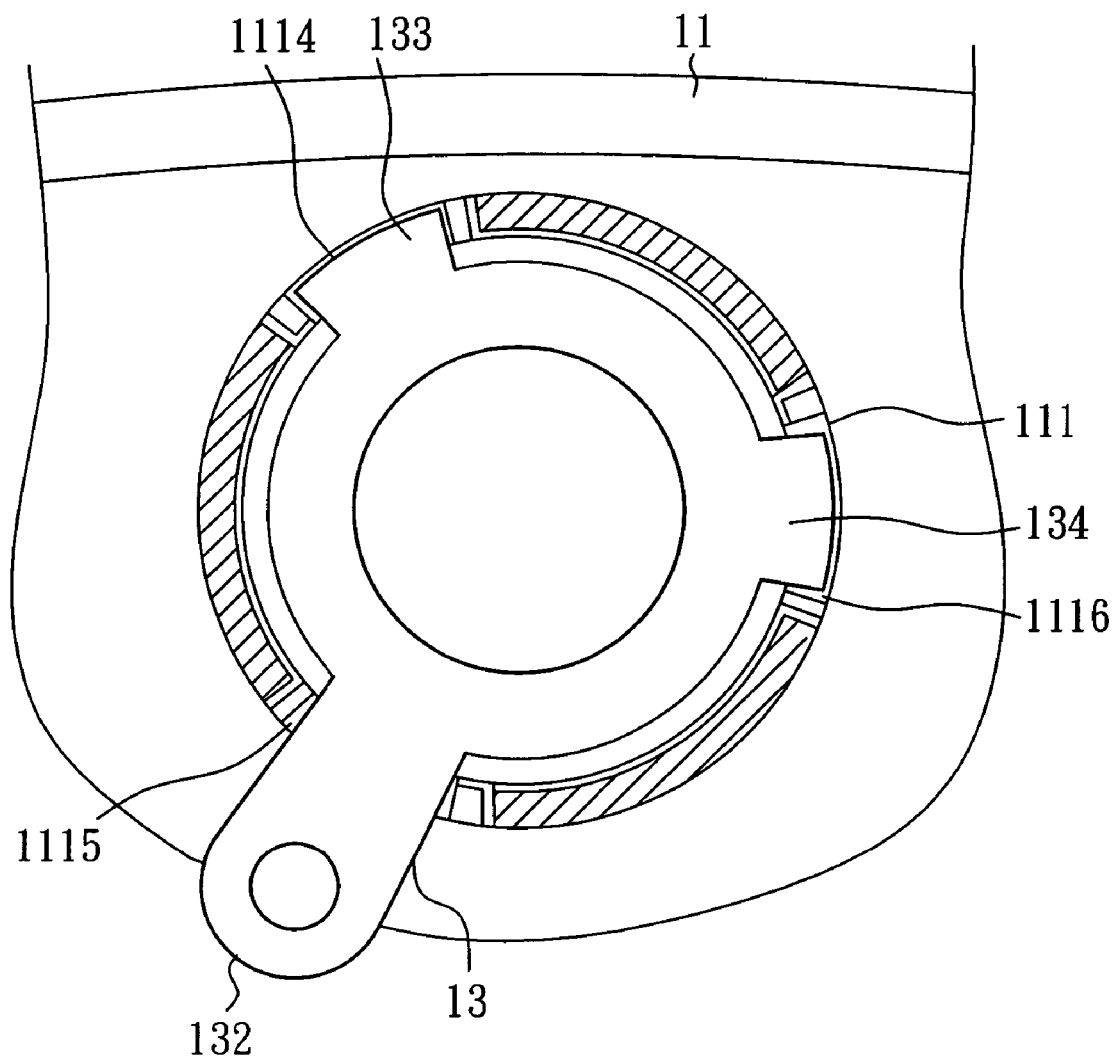
FIG. 4a shows the ring and the housing of the present invention before being assembled.

FIG. 4a shows the ring 13 and the housing 11 before being assembled. In the first embodiment, the housing 11 has openings 1114, 1115, 1116. During assembling the ring 13 and the housing 11, the extended portion 132 passes through one of the openings 1114, 1115, 1116 of the through hole 111. In the embodiment, the extended portion 132 passes through the opening 1115, and the bumps 133, 134 are respectively disposed in the openings 1114 and 1116.

Figure 4B:
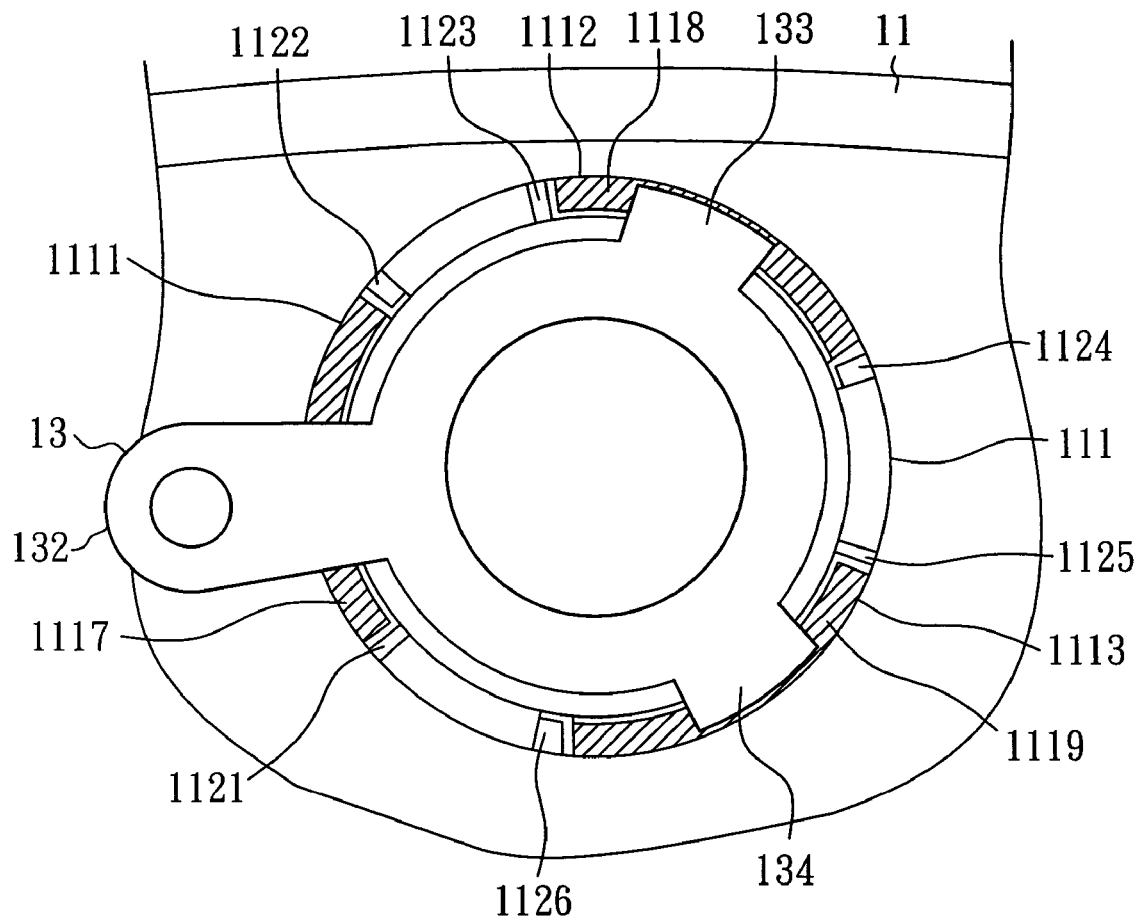
FIG. 4b shows the assembly of the ring and the housing.

Next, as shown in FIG. 4b, two sides of each of the protruding portions 1111, 1112, 1113 corresponding to the openings 1114, 1115, 1116 of the through hole 111 respectively have hitches 1121, 1122, 1123, 1124, 1125, 1126, and a notch is defined between each pair of the hitches. For instance, a notch 1117 is formed between the hitches 1121 and 1122 of the protruding portion 1111. Similarly, the protruding portions 1112 and 1113 correspondingly have the notches 1118 and 1119.

As shown in FIG. 4b, the extended portion 132 crosses the hitch 1121 and enters the notch 1117. Similarly, the bumps 133, 134 correspondingly cross the hitches 1123, 1125 and enter the notches 1118, 1119, wherein the extended portion 132 and the bumps 133, 134 are respectively disposed on the protruding potions 1111, 1112, 1113. Because of the hitches 1121, 1122, 1123, 1124, 1125, 1126, the extended portion 132, the bumps 133, 134 are movably disposed in the notches 1117, 1118, 1119. In another embodiment, the hitches 1121, 1123, and 1125 have hooks to constrain the extended portion 132 and the bumps 133, 134 moving in the notches 1117, 1118, and 1119.

Furthermore, the ring 13 and the housing 11 are capable of being directly assembled. The notches 1117, 1118, 1119 support the extended portion 132 and the bumps 133, 134, and thus the ring 13 is attached to the housing 11.

As described above, the second side 1302 of the ring 13 of the embodiment forms the extended portion 132 and the bumps 133, 134 corresponding to the notches 1117, 1118, 1119 of the through hole 1111 of the housing 11 for coupling the ring 13 to the housing 11. Alternatively, the second side 1302 of the ring 13 is not only formed an extended portion, but also formed one or more bumps depending on different angles. Moreover, the shapes of the extended portion 132 and the bumps may also be modified according to different requirements.

In order to sense the change of the focus of the lens, a block (not shown) may be disposed in the notch 1117 and the users can feel a drop height when the extended portion 132 of the ring 13 passes the block. As mentioned above, the ring is coupled with the through hole of the housing to reduce the manufacturing cost and time.

Although the present invention has been explained in relation to its preferred embodiment, it is to be understood that many other possible modifications and variations can be made without departing from the scope of the invention as hereinafter claimed.

What is claimed is:

1. A mobile device with a digital camera module, comprising:
    a housing having a through hole and a first notch and a second notch formed in the through hole;
    a digital camera module including an arm; and
    a ring having a first side formed thereon an extended portion and a bump, wherein the extended portion is disposed in the first notch and coupled with the arm to thereby form a dynamic relationship, and the bump is disposed in the second notch.

2. The mobile device as claimed in claim 1, wherein the digital camera module further includes a digital lens being adjusted to the through hole.

3. The mobile device as claimed in claim 1, wherein the ring has a second side disposed thereon a driving portion so that the ring is rotated by using the driving portion.

4. The mobile device as claimed in claim 1, wherein a block is formed in the first notch, such that the block provides a drop height when the extended portion of the ring passes the block.

5. The mobile device as claimed in claim 1, wherein two edges of the first notch respectively have a hitch, such that the hitches are kept the extended portion in the first notch when the extended portion is disposed.

6. The mobile device as claimed in claim 1, wherein the through hole further forms a plurality of openings, a plurality of protruding portions disposed between the openings, and the first notch and the second notch are disposed between the two of the protruding portions.

7. The mobile device as claimed in claim 6, wherein a first side of the ring further has a second bump, one of the protruding portions further forms a third notch, and the second bump is disposed in the third notch.

8. A mobile device with a digital camera module, comprising:
    a housing having a through hole, wherein two openings are defined around the through hole and corresponding to at least two protruding portions, and two sides of each of the protruding portions respectively include a hitch;

a digital camera module coupled with the through hole and including an arm; and a ring having a first side, an extended portion and at least one bump disposed on the first side of the ring, the bump disposed on the protruding portion, wherein the extended portion is coupled with the arm.

9. The mobile device as claimed in claim 8, wherein a plurality of notches are formed between the hitches of the protruding portions, such that the extended portion is disposed in one of the notches, and the bump is disposed in one of the other notches.

10. The mobile device as claimed in claim 8, wherein the digital camera module further includes a digital lens being adjusted to the through hole.

11. The mobile device as claimed in claim 8, wherein the ring has a second side and a driving portion disposed on the second side, such that a user is capable of rotating the ring by using the driving portion.

12. The mobile device as claimed in claim 8, wherein a block is formed in the first notch, such that the block provides a drop height when the extended portion of the ring passes the block.

13. The mobile device as claimed in claim 8, wherein each of the hitches has a hook.

14. A method of assembling a mobile device which includes a housing having a through hole, two openings defined around the through hole and corresponding to at least two protruding portions, two sides of each of the protruding portions respectively including a hitch, and a ring including a first side, an extended portion and at least one bump, the method of assembling a mobile device comprising:

passing the extended portion of the ring through one of the openings of the housing; and making the extended portion or the bump of the ring cross the hitches of the housing, wherein the extended portion or the bump is respectively movable corresponding to one of the protruding portions.

15. The method as claimed in claim 14, wherein the mobile device further includes a digital camera module coupled with the through hole, and the digital camera module includes an arm coupled with the extended portion of the ring, and wherein the method further comprises rotating a second side of the ring to link the arm of the digital camera module.

* * * * *